(12) United States Patent
Ishikawa et al.

(10) Patent No.: US 8,249,783 B2
(45) Date of Patent: Aug. 21, 2012

(54) VEHICLE AUTOMATIC TRANSMISSION

(75) Inventors: Tatsuya Ishikawa, Wako (JP); Joko Karasawa, Wako (JP); Makoto Kobayashi, Wako (JP); Yuji Koga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 245 days.

(21) Appl. No.: 12/842,035

(22) Filed: Jul. 23, 2010

(65) Prior Publication Data

US 2011/0022278 A1    Jan. 27, 2011

(30) Foreign Application Priority Data

Jul. 24, 2009   (JP) ................................. 2009-173510

(51) Int. Cl.
*G06F 7/00* (2006.01)
*B60W 10/04* (2006.01)
*B60W 10/10* (2012.01)

(52) U.S. Cl. ................ 701/51; 701/53; 701/55; 701/56; 477/34; 477/107; 477/115

(58) Field of Classification Search .................... 701/51, 701/53
See application file for complete search history.

(56) References Cited

U.S. PATENT DOCUMENTS

| | | | | |
|---|---|---|---|---|
| 4,393,467 A * | 7/1983 | Miki et al. | ........................ | 701/66 |
| 5,157,993 A * | 10/1992 | Abo | ................. | 474/72 |
| 6,672,981 B2 * | 1/2004 | Inoue et al. | ..................... | 474/28 |
| 8,055,416 B2 * | 11/2011 | Matsubara et al. | ............. | 701/54 |
| 2002/0000134 A1 * | 1/2002 | Yamamoto et al. | ............. | 74/335 |
| 2002/0072441 A1 * | 6/2002 | Inoue et al. | ..................... | 474/18 |
| 2004/0040375 A1 * | 3/2004 | Kadota et al. | ................. | 73/116 |
| 2005/0236251 A1 * | 10/2005 | Yamamoto | ................. | 192/219.4 |
| 2007/0254764 A1 * | 11/2007 | Shibata et al. | ................. | 475/117 |
| 2008/0122391 A1 * | 5/2008 | Iwase et al. | .................... | 318/460 |
| 2009/0157269 A1 * | 6/2009 | Matsubara et al. | ............. | 701/54 |
| 2012/0022737 A1 * | 1/2012 | Kumazaki et al. | ............. | 701/22 |

FOREIGN PATENT DOCUMENTS

| | | |
|---|---|---|
| JP | 59-069557 | 4/1984 |
| JP | 7-94854 B2 | 1/1995 |
| JP | 2000-220700 | 8/2000 |
| JP | 2000-346146 | 12/2000 |
| JP | 2001-289288 | 10/2001 |
| JP | 4088566 B2 | 3/2005 |

* cited by examiner

*Primary Examiner* — M. Thein
*Assistant Examiner* — Ariel Yu
(74) *Attorney, Agent, or Firm* — Ditthavong Mori & Steiner, P.C.

(57) ABSTRACT

A vehicle automatic transmission includes a plurality of gears provided on an input shaft, a countershaft, and an output shaft and are meshed with one another. A plurality of hydraulic clutches are each configured to couple any of the gears to the input shaft, the countershaft, or the output shaft to establish a predetermined shift stage. An engagement unit is configured to couple a reverse gear to the input shaft or the countershaft to establish a reverse shift stage. A shift-position detection unit is configured to detect a shift position. A vehicle-speed detection unit is configured to detect a vehicle speed. A control unit is configured to detect, based on an output of the shift-position detection unit, a first time and a second time. The control unit is configured to delay a timing when the engagement unit operates after the shift position changes to an R-position.

6 Claims, 7 Drawing Sheets

| | C1 | C2 | C3 | C4 | C5 | C6 | SELECTOR |
|---|---|---|---|---|---|---|---|
| NEUTRAL | OFF | OFF | OFF | OFF | OFF | OFF | FOURTH SPEED DRIVE GEAR SIDE |
| FIRST FORWARD | ON | → | → | → | → | → | → |
| SECOND FORWARD | OFF | ON | → | → | → | → | → |
| THIRD FORWARD | → | OFF | ON | → | → | → | → |
| FOURTH FORWARD | → | → | OFF | ON | → | → | → |
| FIFTH FORWARD | → | → | → | OFF | ON | → | → |
| SIXTH FORWARD | → | → | → | → | OFF | ON | → |
| REVERSE | → | → | → | ON | → | → | REVERSE DRIVE GEAR SIDE |

VEHICLE AUTOMATIC TRANSMISSION

CROSS REFERENCES TO RELATED APPLICATIONS

The present application relates to Japanese Patent Application No. 2009-173510, filed Jul. 24, 2009, entitled "Vehicle Automatic Transmission." The contents of this application are incorporated herein by reference in their entirety.

BACKGROUND OF THE INVENTION

1. Field of the Invention

The present invention relates to a vehicle automatic transmission.

2. Description of the Related Art

Japanese Patent No. 4088566 discloses an automatic transmission that includes an input shaft, an intermediate shaft, a countershaft, an output shaft, a plurality of clutches capable of coupling gears rotatably supported on the input shaft, the intermediate shaft, and the countershaft to the shafts, and a selector (engagement unit) formed by a dog clutch capable of selecting coupling forward gears and a reverse gear rotatably supported on the countershaft to the countershaft. With this structure, the automatic transmission establishes a plurality of forward shift stages and a reverse shift stage.

When moving a shift lever from a D-position to an R-position via an N-position in the automatic transmission of the related art, or when moving the shift lever from the D-position to a P-position via the N-position and the R-position, a selector operates to couple the reverse gear to the countershaft so as to establish a reverse shift stage the moment the shift lever reaches the R-position.

In this case, in the automatic transmission of the related art, when the selector operates to couple the reverse gear to the countershaft, dog teeth of the reverse gear and dog teeth of the selector are sometimes not smoothly engaged, but are incompletely engaged, as will be described in detail in the following "DESCRIPTION OF THE EMBODIMENTS" of this specification. As a result, trouble occurs, for example, the dog teeth wear abnormally.

Accordingly, it is desirable to allow an engagement unit for coupling a reverse gear to a transmission shaft to smoothly operate when a shift position of an automatic transmission changes from a D-position to an R-position.

SUMMARY OF THE INVENTION

According to one aspect of the present invention, a vehicle automatic transmission includes an input shaft, a countershaft, an output shaft, a plurality of gears, a plurality of hydraulic clutches, an engagement unit, a shift-position detection unit, a vehicle-speed detection unit, and a control unit. To the input shaft, a driving force is to be input from a driving source. The output shaft is configured to output the driving force to driving wheels. The plurality of gears are provided on the input shaft, the countershaft, and the output shaft and are meshed with one another. The plurality of hydraulic clutches are each configured to couple any of the gears to the input shaft, the countershaft, or the output shaft that supports the gears rotatably so as to establish a predetermined shift stage. The engagement unit is configured to couple a reverse gear to the input shaft or the countershaft to establish a reverse shift stage. The reverse gear is constantly coupled to the output shaft via any of the gears. The shift-position detection unit is configured to detect a shift position. The vehicle-speed detection unit is configured to detect a vehicle speed. The control unit is configured to detect, based on an output of the shift-position detection unit, a first time in which the shift position changes from a D-position to an R-position and a second time in which the shift position changes from the D-position to a P-position. The control unit is configured to delay a timing when the engagement unit operates after the shift position changes to the R-position under a condition that the vehicle speed detected by the vehicle-speed detection unit is zero and the first time is shorter than or equal to a first threshold value or the second time is shorter than or equal to a second threshold value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

An embodiment of the present invention will be described below with reference to FIGS. 1 to 7.

Figure 1:
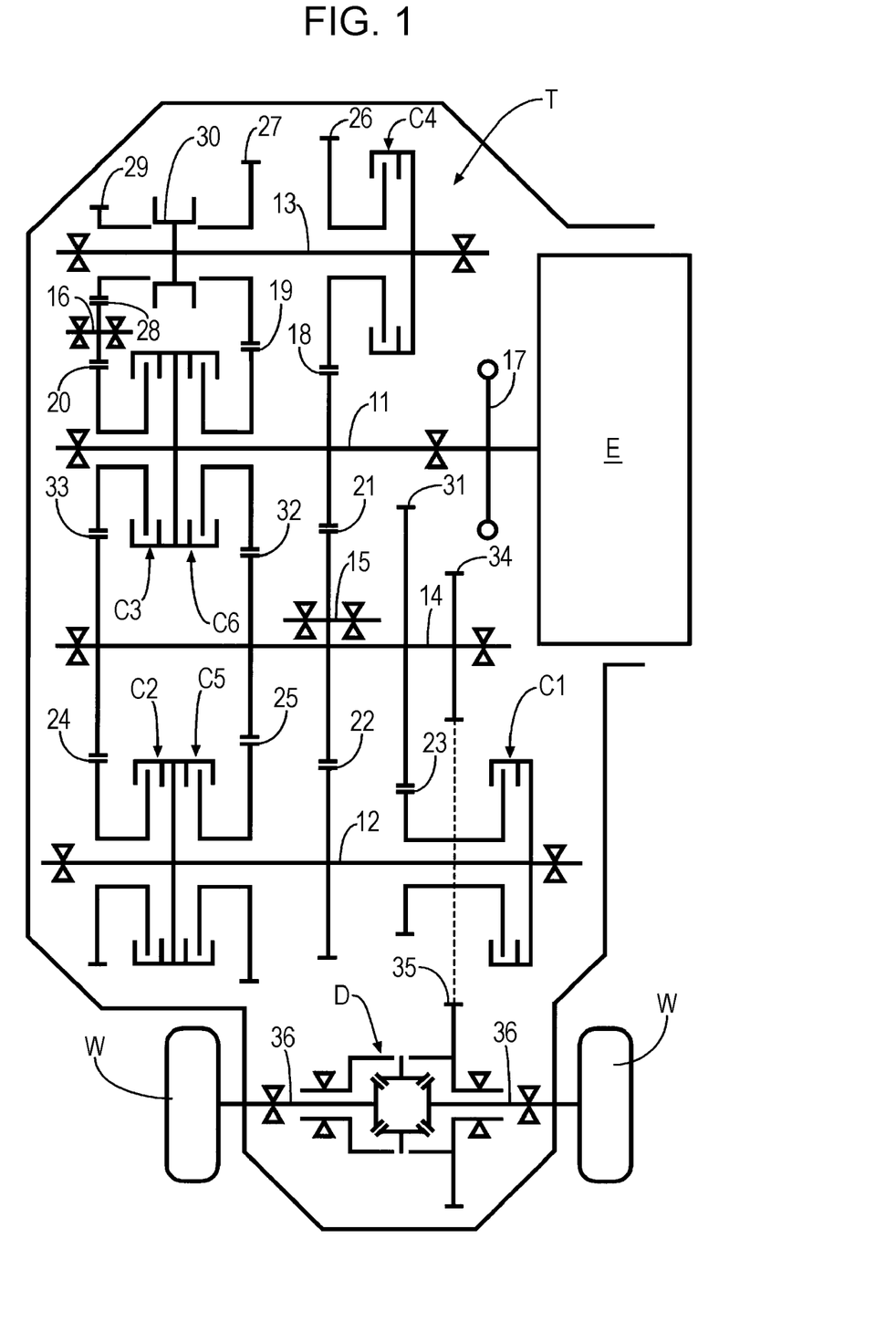
FIG. 1 is a skeleton view of a parallel-shaft automatic transmission for front-engine, front-wheel drive layout.

Referring to FIG. 1, a parallel-shaft automatic transmission T for front-engine, front-wheel drive layout includes an input shaft 11, a first countershaft 12, a second countershaft 13, an output shaft 14, a connecting idle shaft 15, and a reversing idle shaft 16, all of which are arranged in parallel.

The input shaft 11 is connected via a torque converter 17 to an engine E. A main drive gear 18 is fixed to the input shaft 11, and a fourth and sixth speed drive gear 19 and a third speed and reverse drive gear 20 are rotatably supported by the input shaft 11. The fourth and sixth speed drive gear 19 can be coupled to the input shaft 11 via a sixth speed clutch C6, and the third speed and reverse drive gear 20 can be coupled to the input shaft 11 via a third speed clutch C3.

A connecting driven gear 22 is connected to the main drive gear 18 via a connecting idle gear 21 provided in the connecting idle shaft 15, and is fixed to the first countershaft 12. A first speed drive gear 23, a second speed drive gear 24, and a fifth speed drive gear 25 are rotatably supported by the first countershaft 12. The first speed drive gear 23 can be coupled to the first countershaft 12 via a first speed clutch C1, the second speed drive gear 24 can be coupled to the first countershaft 12 via a second speed clutch C2, and the fifth speed drive gear 25 can be coupled to the first countershaft 12 via a fifth speed clutch C5.

A main driven gear 26 meshed with the main drive gear 18, a fourth speed drive gear 27 meshed with the fourth and sixth speed drive gear 19, and a reverse drive gear 29, which is connected to the third speed and reverse drive gear 20 via a reverse idle gear 28 provided on the reversing idle shaft 16, are rotatably supported by the second countershaft 13. The main driven gear 26 can be coupled to the second countershaft 13 via a fourth speed clutch C4, and the fourth speed drive gear 27 and the reverse drive gear 29 can be selectively coupled to the second countershaft 13 via a selector 30 formed by a dog clutch.

A first speed driven gear 31 meshed with the first speed drive gear 23, a fourth, fifth, and sixth speed driven gear 32 meshed with the fourth and sixth drive gear 19 and the fifth speed drive gear 25, a second and third speed and reverse driven gear 33 meshed with the third speed and reverse drive gear 20 and the second speed drive gear 24, and a final drive gear 34 are fixed to the output shaft 14.

Driving force is input from a final driven gear 35 meshed with the final drive gear 34 to a differential gear D. The differential gear D is connected to right and left front wheels W via right and left axles 36.

Figure 2:
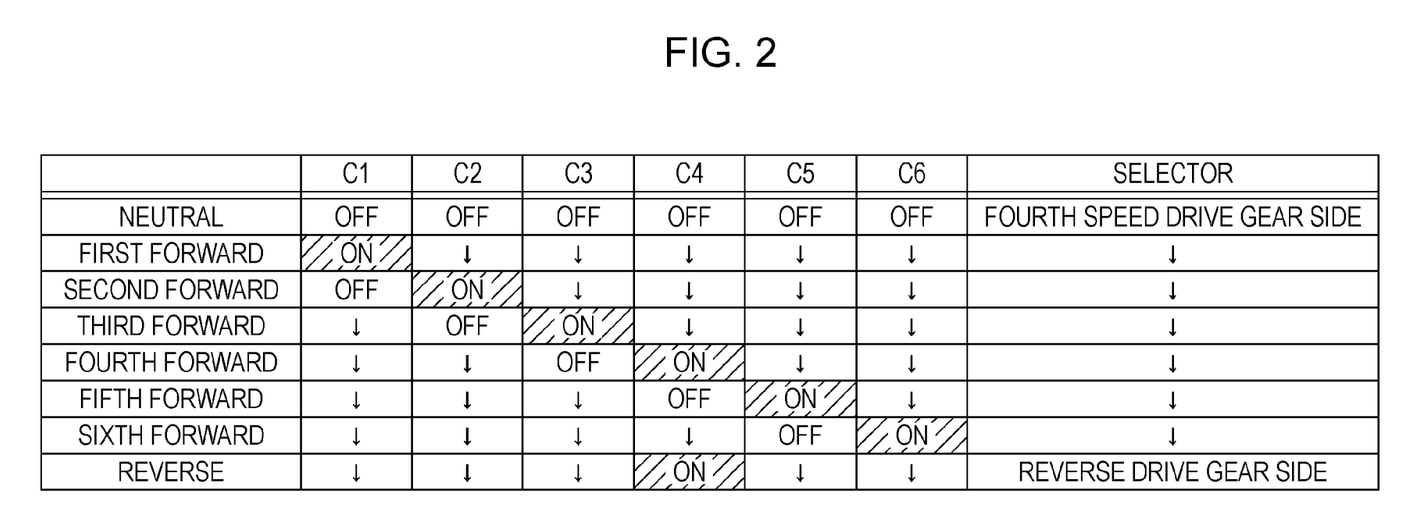
FIG. 2 is a table showing clutch engagement in the automatic transmission.

Referring to a table shown in FIG. 2 showing clutch engagement, when the first speed clutch C1 is engaged in a state in which the fourth speed drive gear 27 is coupled to the second countershaft 13 by moving the selector 30 of the second countershaft 13 to the right, driving force of the engine E is transmitted to the front wheels W via the torque converter 17, the main drive gear 18, the connecting idle gear 21, the connecting driven gear 22, the first countershaft 12, the first speed clutch C1, the first speed drive gear 23, the first speed driven gear 31, the output shaft 14, the final drive gear 34, the final driven gear 35, the differential gear D, and the axles 36 in that order, so that a first shift stage can be established.

Similarly, when the second speed clutch C2 to the sixth speed clutch C6 are selectively engaged in a state in which the fourth speed drive gear 27 is coupled to the second countershaft 13 by moving the selector 30 of the second countershaft 13 to the right, second to sixth shift stages can be established selectively.

When the fourth speed clutch C4 is engaged in a state in which the reverse drive gear 29 is coupled to the second countershaft 13 by moving the selector 30 of the second countershaft 13 to the left, the driving force of the engine E is transmitted to the front wheels W via the torque converter 17, the main drive gear 18, the main driven gear 26, the fourth speed clutch C4, the second countershaft 13, the selector 30, the reverse drive gear 29, the reverse idle gear 28, the third speed and reverse drive gear 20, the second and third speed and reverse driven gear 33, the output shaft 14, the final drive gear 34, the final driven gear 35, the differential gear D, and the axles 36 in that order, so that a reverse shift stage can be established.

Figure 3:
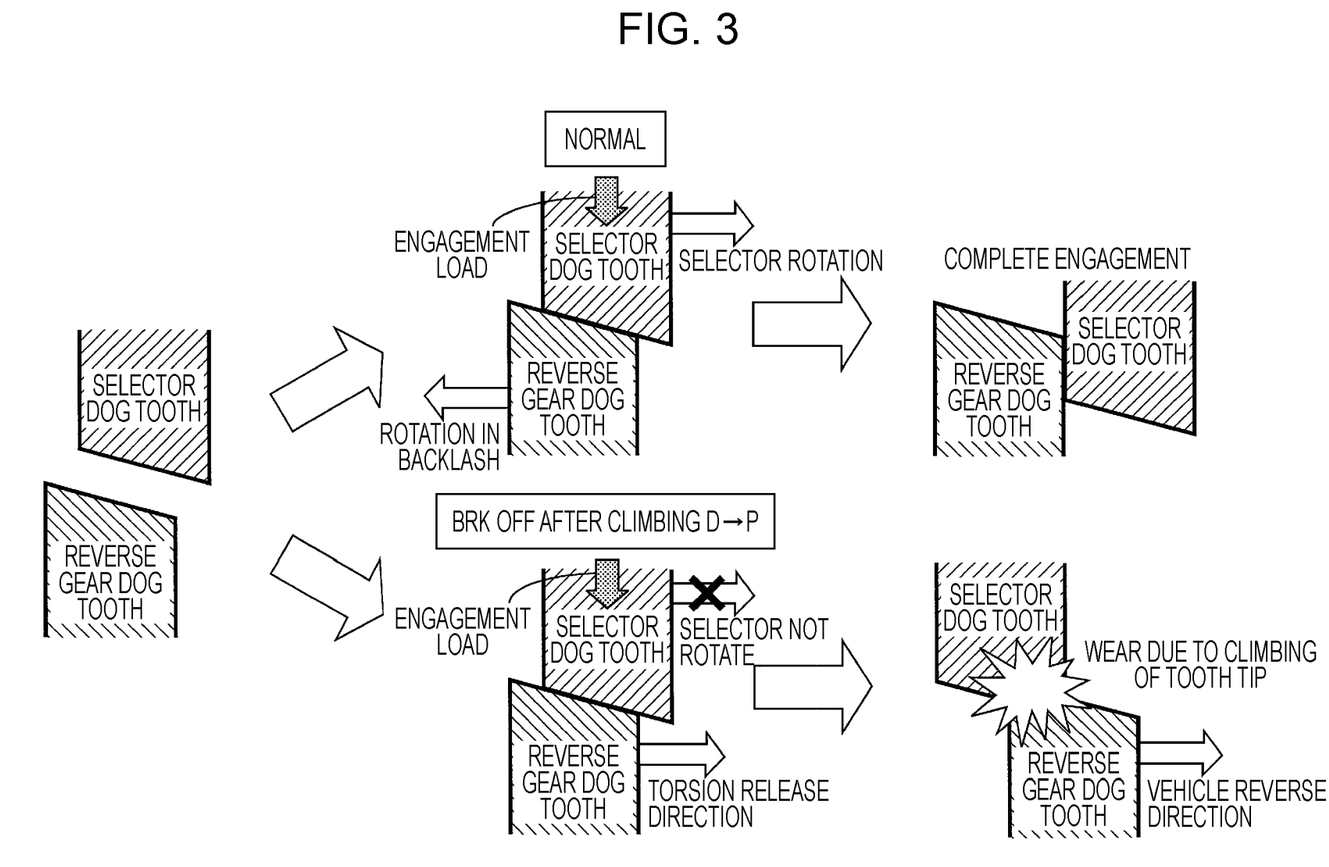
FIG. 3 illustrates engagement of dog teeth of a reverse drive gear and a selector.

When a dog tooth of the selector 30 is engaged with a dog tooth of the reverse drive gear 29 to establish a reverse shift stage, as shown in FIG. 3, if the reverse drive gear 29 and the selector 30 (i.e., the second countershaft 13) can freely move relative to each other, when an axial-direction engagement load is applied to the selector 30, the selector 30 and the reverse drive gear 29 relatively rotate in opposite directions and are completely engaged with each other by the contact of inclined faces of the dog teeth.

However, in the automatic transmission T having the above-described configuration, the reverse drive gear 29 is constantly coupled to the front wheels W via the reverse idle gear 28, the third speed and reverse drive gear 20, the second and third speed and reverse driven gear 33, the output shaft 14, the final drive gear 34, the final driven gear 35, the differential gear D, and the axles 36 in that order, and therefore, the reverse drive gear 29 is restrained so as not to rotate by frictional force between the front wheels W and the road surface while the vehicle is stopped. Particularly when the driver brakes the front wheels W by pressing a brake pedal, the reverse drive gear 29 is restrained more firmly.

In this way, when the vehicle decelerates and stops while the driver is pressing the brake pedal, backlash between the reverse drive gear 29 and the selector 30 is reduced. Further, since the vehicle decelerates and stops, the automatic transmission T performs downshifting, and a first shift stage is established when the vehicle is stopped. When the first shift stage is established, the torque of the engine E is transmitted to the output shaft 14 via the torque converter 17, the main drive gear 18, the connecting idle gear 21, the connecting driven gear 22, the first countershaft 12, the first speed clutch C1, the first speed drive gear 23, and the first speed driven gear 31 in that order. Hence, the output shaft 14 is deflected and held in a twisted manner on the upstream side of the tires or the brake due to a first creep force.

Subsequently, when the driver moves a shift lever from a D-position toward a R-position or a P-position via an N-position, the first speed clutch C1 is disengaged at the moment. Therefore, no torque is input to the output shaft 14, the above-described deflection is removed, and the output shaft 14 slightly rotates in a direction to remove the torque. The moment the shift lever reaches the R-position, the selector 30 is disengaged from the fourth speed drive gear 27 and moves in a direction to engage the reverse drive gear 29 so that the reverse drive gear 29 is coupled to the second countershaft 13 to establish a reverse shift stage.

When the selector 30 moves toward the reverse drive gear 29 together with a shift fork, the dog teeth of the selector 30 come into contact with the dog teeth of the reverse drive gear 29 during this movement. In this case, the reverse drive gear 29 is rotated via the second and third speed and reverse driven gear 33 by the output shaft 14 that is untwisted. However, if the time in which the torque is released is not sufficient, a torsion torque is applied to the reverse drive gear 29, and therefore, the dog teeth of the selector 30 cannot thrush the dog teeth of the reverse drive gear 29 at the contact, and engagement is interrupted. Even after the torsion torque of the output shaft 14 is sufficiently released, that state may be maintained and a state in which a reverse shift stage cannot be established may be continued because of the balance of sliding frictional force among a back surface of the reverse drive gear 29, the second countershaft 13, and the selector 30 caused by the pressing force of the selector 30.

That is, in a case in which the reverse drive gear 29 starts rotation in a direction to remove the deflection, when the time is considerably short, residual pressure of the first speed clutch C1 is not removed. Consequently, the output shaft 14 is twisted by the creep force of the first speed clutch C1, the reverse drive gear 29 is brought into a fixed state via the reverse driven gear, 33, the third speed and reverse drive gear 20, and the reverse idle shaft 16, so that the dog teeth of the reverse drive gear 29 cannot move. Although the reverse drive gear 29 is made rotatable with a sufficiently weak force by releasing the residual pressure of the first speed clutch C1 and the shift fork is operated at this time in a normal case, the deflection is sometimes not instantaneously removed, but is maintained for a fixed time while gradually decreasing. This hinders thrusting of the dog teeth.

Accordingly, in the embodiment, when the driver stops the vehicle and moves the shift lever from the D-position to the R-position or moves the shift lever from the D-position to the P-position via the R-position, the operation in which the selector 30 immediately moves into engagement with the reverse drive gear 29 at the R-position is delayed, and the selector 30 is moved only after drag is removed by completely removing the hydraulic oil of the first speed clutch C1, the output shaft 14 is completely untwisted, and the selector 30 and the reverse drive gear 29 are freely rotatable. This allows the dog teeth of the selector 30 to smoothly engage with the dog teeth of the reverse drive gear 29.

Figure 4:
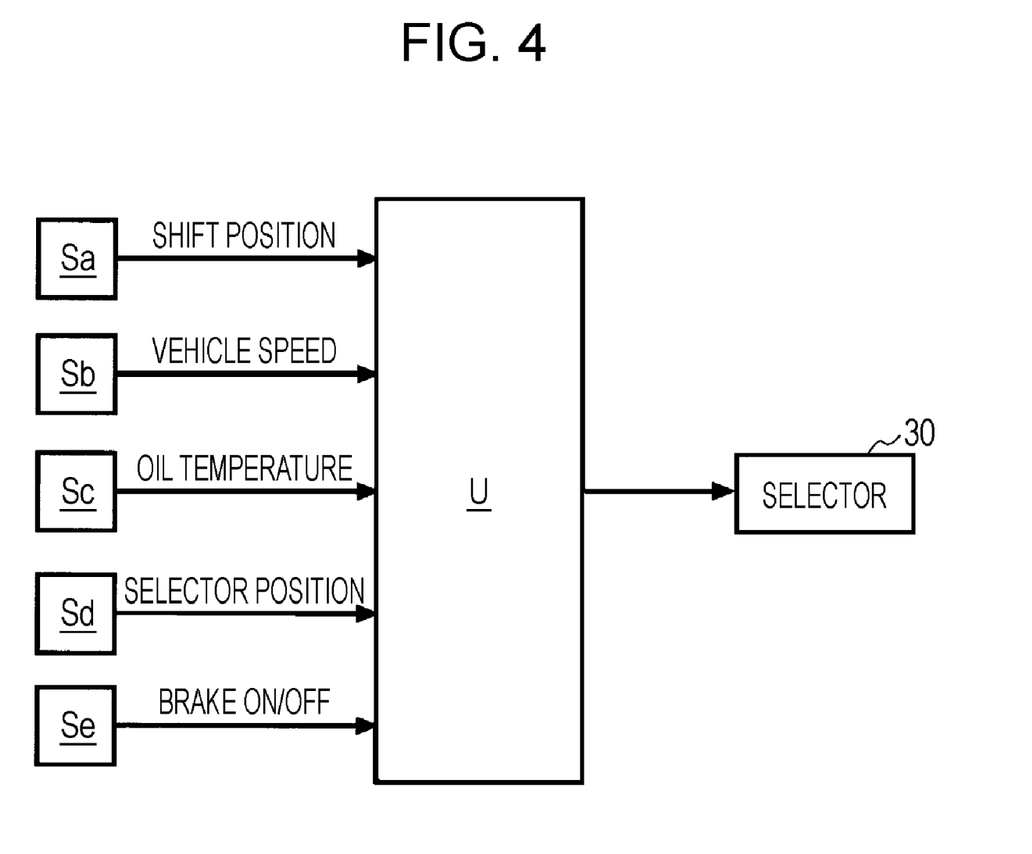
FIG. 4 is a block diagram of a control system for controlling operation of the selector.

As shown in FIG. 4, a shift-position detection unit Sa for detecting the shift position selected by the shift lever, a vehicle-speed detection unit Sb for detecting the vehicle speed, an oil-temperature detection unit Sc for detecting the oil temperature of the automatic transmission T, a selector-position detection unit Sd for detecting the position of the selector 30 (D-side or R-side), and a brake detection unit Se for detecting the operation of the brake pedal by the driver are connected to an electronic control unit U for controlling the operation of the selector 30 in the automatic transmission T. The electronic control unit U controls the operation of the selector 30 (that is, operation of a shift solenoid for driving the selector 30) on the basis of the shift position, vehicle speed, oil temperature, position of the selector 30, and operating condition of the brake pedal.

Figure 5:
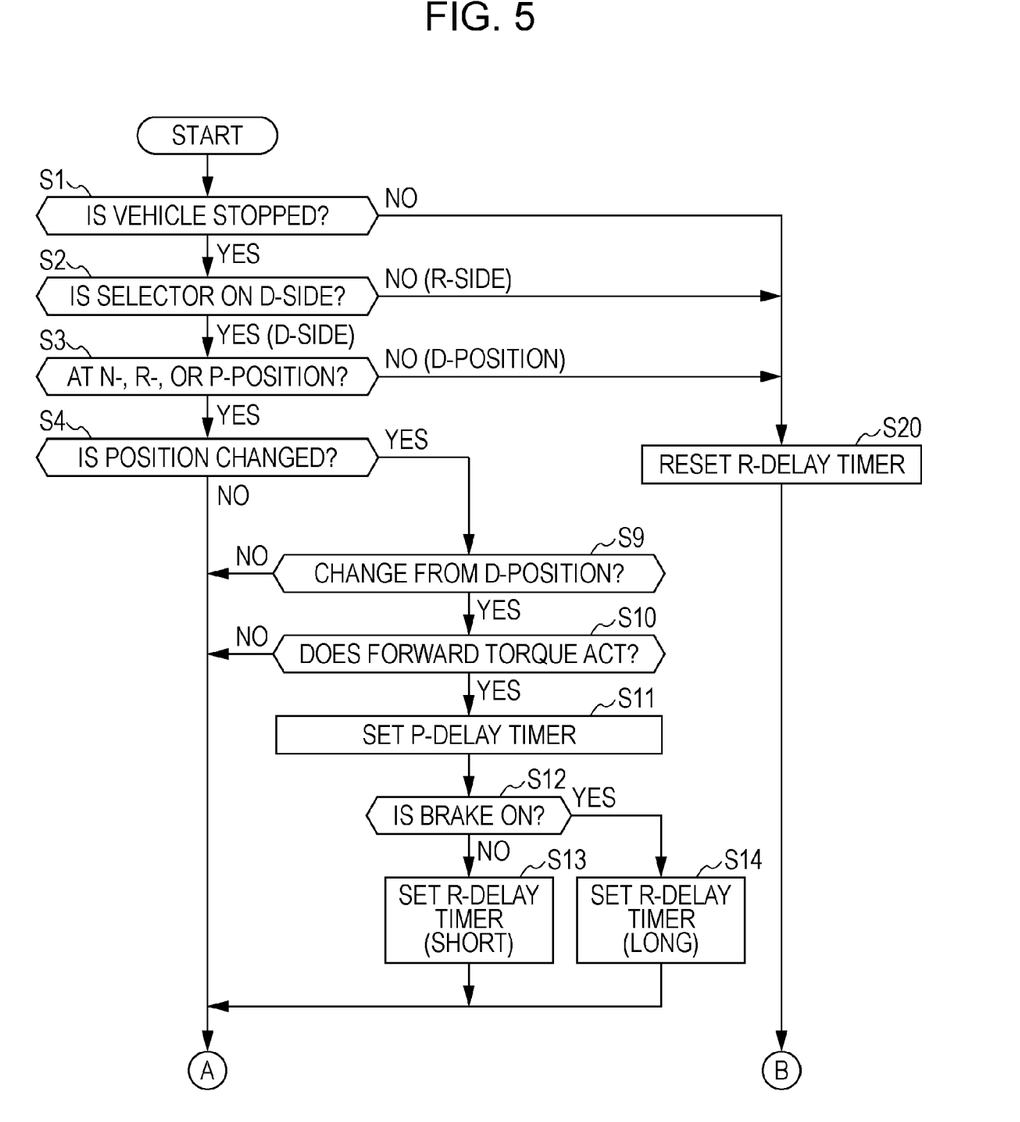
FIG. 5 is a first part of a flowchart explaining the operation.
Figure 6:
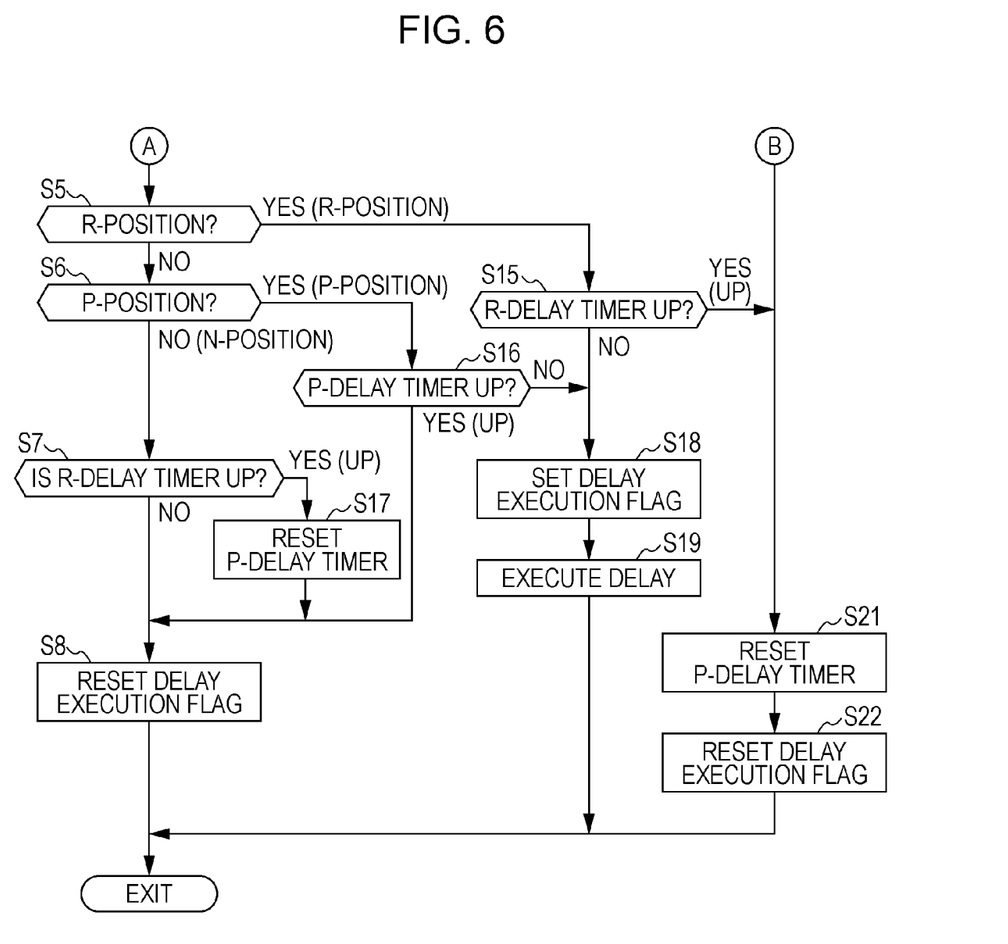
FIG. 6 is a second part of the flowchart explaining the operation.

Next, control of operation of the selector 30 will be described with reference to flowcharts of FIGS. 5 and 6.

First, when it is determined in Step S1, from the output of the vehicle-speed detection unit Sb, that the vehicle is stopped, it is determined in Step S2, from the output of the selector-position detection unit Sd, that the selector 30 is on the D-side (side to be engaged with the fourth speed drive gear 27), it is determined in Step S3, from the output of the shift-position detection unit Sa, that the shift position is an N-position, an R-position, or a P-position, and it is determined in Step S4, from the output of the shift-position detection unit Sa, that the shift position is currently changed, Steps S9 to S14 are performed.

When the shift position changes from the D-position to the N-, R-, or P-position in Step S9 and a forward torque is input from the engine E to the automatic transmission T in Step S10, a P-delay timer (second threshold value) is set in Step S11. In the next Step S12, it is determined, from the output from the brake detection unit Se, whether the driver is pressing the brake pedal. If the driver is not pressing the brake pedal in Step S12, that is, when the reverse drive gear 29 coupled to the front wheels W is not firmly restrained, an R-delay timer (first threshold value) is set for a short time. When the driver is pressing the brake pedal in Step S12, that is, when the reverse drive gear 29 coupled to the front wheels W is firmly restrained, the R-delay timer (first threshold value) is set for a long time.

When the determination result in Step S4 is NO, Step S5 is performed in the next loop. In Step S5, when the shift lever is moved to the R-position, that is, the driver moves the shift lever from the D-position to the R-position, and when the R-delay timer is not up in Step S15, a delay execution flag is set in Step S18 so as to delay an operation of driving the selector 30 into engagement with the reverse drive gear 29 in Step S19.

When the shift lever is not moved to the R-position in Step S5, but is moved to the P-position in Step S6, that is, when the driver moves the shift lever from the D-position to the P-position beyond the R-position, if the P-delay timer is not up in Step S16, the delay execution flag is set in Step S18 so as to delay the operation of driving the selector 30 into engagement with the reverse drive gear 29 in Step S19.

When the shift lever is not moved to the R-position in Step S5 and is not moved to the P-position in Step S6, that is, the shift lever is moved to the N-position, even when the R-delay timer is not up in Step S7, it is determined in Step S8 that delay is not to be made, and the delay execution flag is reset. In contrast, when the R-delay timer is up in Step S7, the P-delay timer is reset in Step S17, and it is then determined in Step S8 that delay is not to be made, and the delay execution flag is reset. When the P-delay timer is up in Step S16, it is determined in Step S8 that delay is not to be made and the delay execution flag is reset.

When the vehicle is running in Step S1, the selector 30 is already placed at the R-side (side to be engaged with the reverse drive gear 29) in Step S2, or the shift position still remains at the D-position in Step S3, the R-delay timer is reset in Step S20, the P-delay timer is reset in Step S21, and the delay execution flag is reset in Step S22. When the R-delay timer is up in Step S15, the P-delay timer is reset in Step S21, and the delay execution flag is reset in Step S22.

Figure 7:
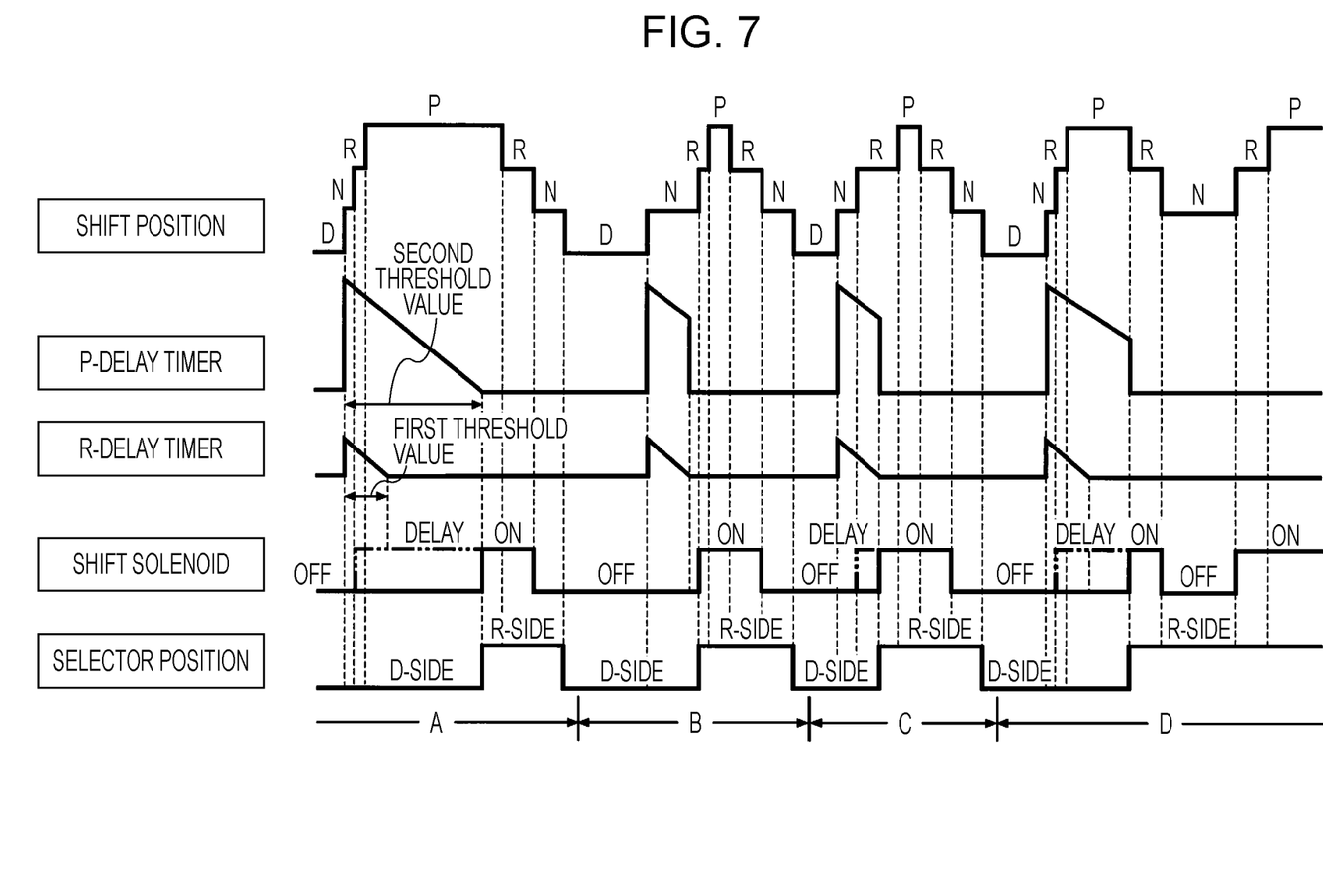
FIG. 7 is a time chart explaining the operation.

The above-described operation will be more specifically described with reference to a time chart shown in FIG. 7.

In an A-region, the P-delay timer is set at the second threshold value the moment the shift position changes from the D-position, and the R-delay timer is set at the first threshold value. While the shift solenoid is turned on and the selector 30 is moved from the D-side to the R-side when the shift position reaches the R-position (see Step S5) in the related art, since the R-delay timer is not up (see Step S15), delay is executed and the shift solenoid is not turned on (see Step S19) in the embodiment. Since the P-delay timer is not up (see Step S16) when the shift position reaches the P-position beyond the R-position (see Step S6), delay is executed and the shift solenoid is not turned on (see Step S19). When the P-delay timer is up (see Step S16), the delay is finished, and the shift solenoid is turned on (see Step S8).

In a B-region, the P-delay timer and the R-delay timer are set the moment the shift position changes from the D-position. Since the R-timer has been up (see Step S15) when the shift position reaches the R-position (see Step S5), the P-delay timer is reset (see Step S21), delay is not executed, and the shift solenoid is turned on (see Step S22).

In a C-region, the P-delay timer and the R-delay timer are set the moment the shift position changes from the D-position. Since the R-delay timer is not up (see Step S15) when the shift position reaches the R-position (see Step S5), delay is executed and the shift solenoid is not turned on (see Step S19). Then, when the R-delay timer is up (see Step S15), the P-delay timer is reset (see Step S21), the delay is finished, and the shift solenoid is turned on (see Step S22).

In a D-region, the P-delay timer and the R-delay timer are set the moment the shift position changes from the D-position. Since the R-delay timer is not up (see Step S15) when the shift position reaches the R-position (see Step S5), delay is executed and the shift solenoid is not turned on (see Step S19). When the shift position reaches the P-position and then returns to the R-position again, the R-delay timer has been already up. Hence, the P-delay timer is reset (see Step S21), the delay is finished, and the shift solenoid is turned on (see Step S22).

As described above, according to the embodiment, since the rotation of the reverse drive gear 29 is firmly restrained while the driver is pressing the brake pedal, the reverse drive gear 29 and the selector 30 can be reliably engaged by setting the R-delay timer (first threshold value) at a large value. Conversely, since the rotation of the reverse drive gear 29 is not firmly restrained while the driver is not pressing the brake pedal, a delay longer than necessary can be avoided by setting the R-delay timer (first threshold value) at a small value.

In addition, in the embodiment, the R-delay timer (first threshold value) and the P-delay timer (second threshold value) are changed in accordance with the oil temperature detected by the oil-temperature detection unit Sc.

That is, since the viscosity of oil is low when the oil temperature is high, the time taken from when the supply of hydraulic oil is stopped to disengage the first speed clutch C1 to when the hydraulic pressure is completely removed and drag of the first speed clutch C1 is removed, that is, to when the selector 30 and the reverse drive gear 29 become freely rotatable is short. Hence, the first and second threshold values can be set at small values. Conversely, since the viscosity of oil is high when the oil temperature is low, the time taken from when the supply of hydraulic pressure is stopped to disengage the first speed clutch C1 to when the hydraulic pressure is completely removed and drag of the first speed clutch C1 is removed becomes long. Hence, it is necessary to set the first and second threshold values at large values.

While the embodiment of the present invention has been described above, various design variations are possible without departing from the scope of the invention.

For example, while the automatic transmission T of the embodiment has forward sixth shift stages, the number of shift stages is not limited thereto.

While the reverse drive gear 29 is provided on the first countershaft 12 in the embodiment, it may be provided on the input shaft 11 or the second countershaft 13.

While the driving source is the engine E in the embodiment, it may be a motor generator or a combination of the engine E and the motor generator.

According to the embodiment of the present invention, the automatic transmission includes the input shaft to which a driving force is input from the driving source, the countershaft, the output shaft configured to output the driving force to the driving wheels, a plurality of gears provided on the input shaft, the countershaft, and the output shaft in a manner such as to be meshed with one another, a plurality of clutches each configured to couple any of the gears to the input shaft, the countershaft, or the output shaft, which supports the gear rotatably, so as to establish a predetermined shift stage, the engagement unit configured to couple the reverse gear for establishing a reverse shift stage to the input shaft or the countershaft; and the control unit configured to control the operation of the engagement unit.

Since the reverse gear is constantly coupled to the output shaft via any of the gears, the rotation thereof is restrained when a vehicle is stopped. Further, the rotation of the engagement unit is restrained by drag caused after the supply of hydraulic pressure to the hydraulic clutch is stopped. For this reason, when the shift position changes from the D-position to the R-position, engagement of the engagement unit and the reverse gear for establishing the reverse shift stage may not be smoothly performed.

However, in a state in which the vehicle speed detected by the vehicle-speed detection unit is zero, the first time in which the shift position changes from the D-position to the R-position and the second time in which the shift position changes from the D-position to the P-position are detected by the shift-position sensor. When the first time is shorter than or equal to the first threshold value or the second time is shorter than equal to the second threshold value, the time at which the engagement unit operates at the R-position is delayed. Thus, the engagement unit is operated after drag of the hydraulic clutch is removed and the engagement unit becomes freely rotatable. As a result, the engagement unit can be smoothly engaged with the reverse gear, and this prevents abnormal wear.

Preferably, the automatic transmission according to the embodiment of the present invention further includes a brake detection unit configured to detect a brake on the driving wheels. When the brake detection unit detects a brake on the driving wheels, the first threshold value is set to be longer than when the brake on the driving wheels is not detected.

In this case, when a brake on the driving wheels is detected by the brake detection unit, that is, when the rotation of the reverse gear is firmly restrained, the first threshold value is set to be longer than when the brake on the driving wheels is not detected by the brake detection unit, that is, when the rotation of the reverse gear is not firmly restrained. This extends the delay time until the engagement unit starts operation, and thereby reliably prevents an incomplete engagement of the engagement unit.

Preferably, the automatic transmission according to the embodiment of the present invention further includes an oil-temperature detection unit configured to detect an oil temperature of the automatic transmission. The first threshold value and the second threshold value are set to increase as the oil temperature detected by the oil-temperature detection unit decreases.

In this case, the first threshold value and the second threshold value are set to increase as the oil temperature detected by the oil-temperature detection unit decreases, that is, as the time from when the supply of hydraulic pressure to the hydraulic clutch is stopped and to when the hydraulic pressure is removed, the hydraulic clutch is completely disengaged, and drag is removed increases. This extends the delay time until the engagement unit starts operation, and thereby reliably prevents an incomplete engagement of the engagement unit.

First to sixth speed clutches C1 to C6 of the embodiment correspond to the hydraulic clutches of the present invention, an engine E of the embodiment corresponds to the driving source of the invention, an electronic control unit U of the embodiment corresponds to the control unit of the invention, front wheels W of the embodiment correspond to the driving wheels of the invention, first and second countershafts 12 and 13 of the embodiment correspond to the countershaft of the invention, a reverse drive gear 29 of the embodiment corresponds to the reverse gear of the invention, and a selector 30 of the embodiment corresponds to the engagement unit of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle automatic transmission comprising:
an input shaft to which a driving force is to be input from a driving source;
a countershaft;
an output shaft configured to output the driving force to driving wheels;
a plurality of gears meshed with one another and provided on the input shaft, the countershaft, and the output shaft;
a plurality of hydraulic clutches each configured to couple any of the gears to the input shaft, the countershaft, or the output shaft that supports the gears rotatably so as to establish a predetermined shift stage;
an engagement unit configured to couple a reverse gear to the input shaft or the countershaft to establish a reverse shift stage, the reverse gear being constantly coupled to the output shaft via any of the gears;
a shift-position detection unit configured to detect a shift position;
a vehicle-speed detection unit configured to detect a vehicle speed; and
a control unit configured to detect, based on an output of the shift-position detection unit, a first time in which the shift position changes from a D-position to an R-position and a second time in which the shift position changes from the D-position to a P-position, and configured to delay a timing when the engagement unit operates after the shift position changes to the R-position under a condition that the vehicle speed detected by the vehicle-speed detection unit is zero and the first time is shorter than or equal to a first threshold value or the second time is shorter than or equal to a second threshold value.

2. The vehicle automatic transmission according to claim 1, further comprising:
a brake detection unit configured to detect a brake on the driving wheels,
wherein, when the brake detection unit detects the brake on the driving wheels, the first threshold value is set to be longer than when the brake on the driving wheels is not detected.

3. The vehicle automatic transmission according to claim 1, further comprising:
an oil-temperature detection unit configured to detect an oil temperature of the automatic transmission,
wherein the first threshold value and the second threshold value are set to increase as the oil temperature detected by the oil-temperature detection unit decreases.

4. A vehicle automatic transmission comprising:
an input shaft to which a driving force is to be input from a driving source;
a countershaft;
an output shaft configured to output the driving force to driving wheels;
a plurality of gears provided on the input shaft, the countershaft, and the output shaft and meshed with one another;
a plurality of hydraulic clutches each configured to couple any of the gears to the input shaft, the countershaft, or the output shaft that supports the gears rotatably so as to establish a predetermined shift stage;
engagement means for coupling a reverse gear to the input shaft or the countershaft to establish a reverse shift stage, the reverse gear being constantly coupled to the output shaft via any of the gears;
shift-position detection means for detecting a shift position;
vehicle-speed detection means for detecting a vehicle speed; and
control means for detecting, based on an output of the shift-position detection means, a first time in which the shift position changes from a D-position to an R-position and a second time in which the shift position changes from the D-position to a P-position, and for delaying a timing when the engagement means operates after the shift position changes to the R-position under a condition that the vehicle speed detected by the vehicle-speed detection means is zero and the first time is shorter than or equal to a first threshold value or the second time is shorter than or equal to a second threshold value.

5. The vehicle automatic transmission according to claim 4, further comprising:
brake detection means for detecting a brake on the driving wheels,
wherein, when the brake detection means detects the brake on the driving wheels, the first threshold value is set to be longer than when the brake on the driving wheels is not detected.

6. The vehicle automatic transmission according to claim 4, further comprising:
oil-temperature detection means for detecting an oil temperature of the automatic transmission,
wherein the first threshold value and the second threshold value are set to increase as the oil temperature detected by the oil-temperature detection means decreases.

* * * * *